United States Patent [19]

McCoy et al.

[11] 3,966,426

[45] June 29, 1976

[54] COOKING VESSEL FOR USE WITH INDUCTION HEATING COOKING UNIT

[75] Inventors: Robert A. McCoy, Turtle Creek; William C. Moreland, II, Export, both of Pa.

[73] Assignee: White-Westinghouse Corporation, Cleveland, Ohio

[22] Filed: Mar. 24, 1972

[21] Appl. No.: 237,703

[52] U.S. Cl. ............................ 29/196.2; 29/196.3; 219/10.49; 219/10.79
[51] Int. Cl.² ................................................ H05B 1/02
[58] Field of Search ............ 29/196.2, 196.1, 196.3; 219/10, 49, 67, 79

[56] References Cited
UNITED STATES PATENTS

| | | | |
|---|---|---|---|
| 2,490,549 | 12/1949 | Schultz | 29/196.2 |
| 2,494,266 | 1/1950 | Savullo | 29/196.1 |
| 2,653,117 | 9/1953 | Keene | 29/196.1 |
| 2,718,690 | 9/1955 | Ulam | 29/196.3 |
| 2,908,073 | 10/1959 | Dulin | 29/196.2 |
| 3,098,921 | 9/1963 | Jepson | 29/196.3 |
| 3,173,202 | 3/1965 | Farber | 29/196.2 |
| 3,648,353 | 2/1972 | Anderson | 29/196.1 |
| 3,684,853 | 8/1972 | Welch | 29/196.1 |

FOREIGN PATENTS OR APPLICATIONS

| | | | |
|---|---|---|---|
| 1,157,711 | 7/1969 | United Kingdom | 219/196.2 |

*Primary Examiner*—Arthur J. Steiner
*Attorney, Agent, or Firm*—McNenny, Pearne, Gordon, Gail, Dickinson & Schiller

[57] ABSTRACT

The cooking vessel has a laminated wall including one layer of a magnetic material having a thickness, determined in accordance with skin depth as a function of the operating frequencies of the cooking device so that the major part of the power is developed in the one layer and substantial penetration of the magnetic field produced by the device beyond the layer is prevented, and another layer of relatively high thermal conductivity material which promotes the uniform distribution of heat derived from the magnetic layer throughout the other layer.

5 Claims, 3 Drawing Figures

U.S. Patent   June 29, 1976   3,966,426
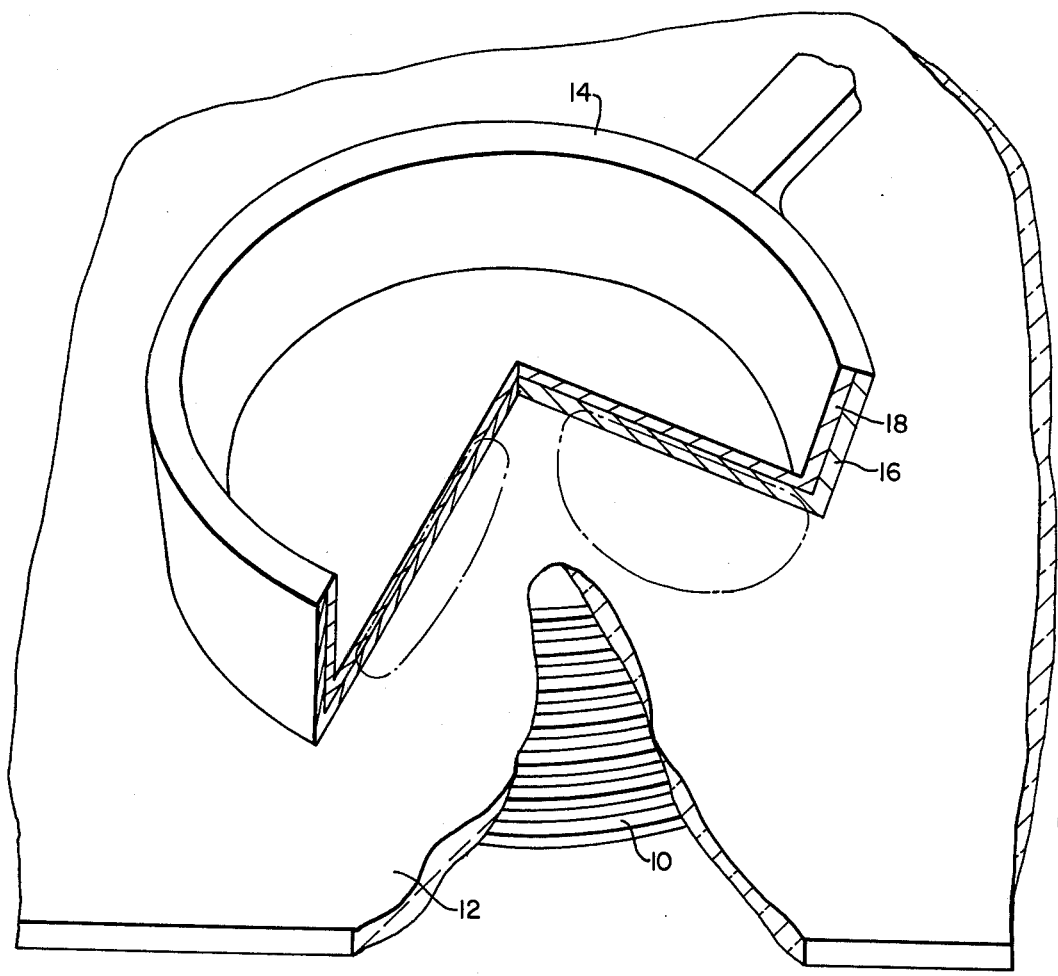
FIG. 1.
| SKIN DEPTH OF SELECTED MATERIALS AT 24 KHz | | | |
|---|---|---|---|
| MATERIAL | ρ (OHM-INCHES) | μ (SAT.) | SKIN DEPTH AT 24 KHz (INCHES) |
| 1008 STEEL | $9.0 \times 10^{-6}$ | 200 | .004 |
| 432 S.S. | $24.5 \times 10^{-6}$ | 200 | .007 |
| 304 S.S. | $29 \times 10^{-6}$ | 1 | .112 |
| ALUMINUM | $1.12 \times 10^{-6}$ | 1 | .022 |
| COPPER | $0.68 \times 10^{-6}$ | 1 | .017 |
FIG. 2.
FIG. 3.
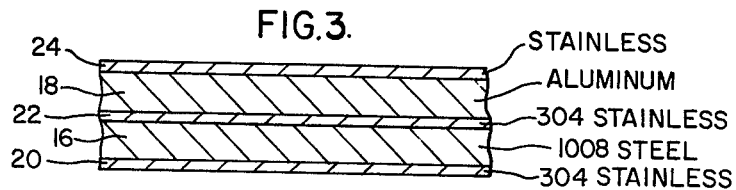

COOKING VESSEL FOR USE WITH INDUCTION HEATING COOKING UNIT

BACKGROUND OF THE INVENTION

1. Field of the Invention

The invention pertains to the art of cooking vessels especially adapted for use with induction heating cooking devices.

2. Description of the Prior Art:

Some of the desirable characteristics of cooking vessels, i.e., pots and pans, are light weight, ease of cleaning, abrasion and corrosion resistance, high thermal conductivity, good appearance, and reasonable cost. Some of these characteristics may be sacrificed for other desirable characteristics, an example of this being a pancake griddle which may be a relatively heavy unit to obtain high heat capacity and good thermal conductivity.

One of the currently more popular materials for making pots and pans is aluminum. For conventional cooking heat sources such as gas and electrical resistance heaters, it meets all the basic requirements reasonably well. Stainless steel is also popular because of its better appearance, and higher abrasion and corrosion resistance. However stainless steel has the disadvantage of being relatively more expensive and providing less uniform temperatures because of its lower thermal conductivity. To obtain one or more of the desirable characteristics noted above, various laminated wall structures have been devised. For example, the laminated wall may include a thin stainless steel exterior and an aluminum or carbon steel interior. Other examples include the relatively common and inexpensive pans of steel which are porcelain clad on both faces, of steel which is chrome plated exteriorly, and of stainless steel which is clad exteriorly on the bottom of the pot area with aluminum.

These vessels of laminated structure, as well as vessels of nonlaminated structure such as cast iron can all be heated by the induction heating principle. Also, vessels which are especially adapted for induction heating cooking at low frequencies have been devised in which a plurality of armature plates of steel have been arranged to form a depending ring on the bottom of an aluminum vessel as disclosed in U.S. Pat. Nos. 1,739,617 and 2,415,853 for example. however none of the commercially available cooking vessels of which we are aware possess all of the characteristics which we believe desirable in the cooking vessels for use with an induction heating cooking device.

Accordingly, the aim of our invention is to provide cooking vessels having characteristics especially adapting them for use with induction heating cooking devices.

SUMMARY OF THE INVENTION

In accordance with the broader aspects of the invention, the cooking vessel contemplated by the invention has a laminated wall adapted to be placed in proximity with the induction coil of the induction heating unit, with the wall including at least two metallic layers successively farther from the induction coil. One layer is of a magnetic material having sufficient thickness to prevent substantial penetration of the magnetic field produced by the coil beyond the layer. Another layer is of relatively high thermal conductivity material for promoting the uniform distribution of heat derived from said one layer throughout the said another layer. The layers are substantially coextensive in area, and each is of substantially uniform thickness. In the currently preferred form of the invention, the laminated wall includes an additional layer on the face of the first mentioned layer which in use is closer to the coil, the additional layer being of a metallic material having relatively low magnetic permeability, a thickness of less than one skin depth within the range of the operating frequencies, and relatively high electrical resistivity as compared to the electrical resistivity of the first mentioned layer.

DRAWING DESCRIPTION

FIG. 1 is a generally schematic isometric view, broken in part, of a cooking vessel according to the invention in place upon an induction heating cooking device;

FIG. 2 is a table giving resistivity, permeability, and skin depths (at 24 kHz) of various materials; and FIG. 3 is a cross section through a fragmentary portion of one example of a laminated wall of a cooking vessel according to the invention.

DESCRIPTION OF THE PREFERRED EMBODIMENTS

Fundamental Principles

A basic consideration in obtaining efficient induction heating, whether in industrial processes or in cooking as this invention is related to, is to have the major heating occur in the work object (cooking vessel), relative to that which occurs in the induction heating coil. If the geometric relationship between the cooking vessel and the coil is ignored, a factor which affects efficient induction heating significantly is the relationship between the effective electrical resistance of the drive coil and the vessel. If the effective resistance of the vessel relative to the coil is very high, (as with a glass vessel and a copper coil) the current density produced in the vessel will be low compared to the current density in the coil. With this condition, negligible heating occurs in the vessel while almost all the heating occurs in the coil. If the vessel has an effective resistance comparable to that of the coil, the current density in both will be about the same, with the heating in both being about the same. However, there are a number of ferrous materials, such as the carbon steels, which have resistivity values that taken in conjunction with the characteristics and operating conditions of the drive coil, provide relatively efficient heating.

This portion of the utensil material in which the major heating is to take place is not selected on the basis of resistivity alone however, because of the phenomenon known as skin effect, which becomes important at the frequencies at which the device operates. As is well known, this skin effect results from the tendency of the current density to be greatest at the surface of the work object and the tendency of the current to decrease exponentially in a direction away from the surface.

Thus the skin effect produces an apparent increase in the resistance of the conductor, as compared to the resistance of the conductor with respect to a DC voltage.

The general distribution of current in a work object may be viewed in terms of skin depth (or as sometimes called reference depth) which may be calculated, and in which the skin depth will vary in accordance with the electrical resistivity of the material, its magnetic permeability relative to free space, and the frequency of the drive coil. The classical equation for skin depth in inches is:

$$\delta = 3160 \left(\frac{\rho}{\mu f}\right)^{1/2}$$

where
$\rho$ = resistivity (ohm-inches)
$\mu$ = magnetic permeability (relative to free space)
f = frequency (Hertz)

The depth which is calculated from the above equation is that depth at which the induced current density equals $1/e$ the value of the induced current density at the surface of the material, $e$ being the base of the natural logarithm system and being approximately 2.718. At a depth of approximately two skin depths, the current density has decreased to approximately thirteen and one half percent of the current density of the surface, and at three skin depths, the current density has decreased to approximately five percent. Accordingly, with the exponential decrease in current density it will be appreciated that only a minor change in effective resistance of the material can be obtained by increasing its thickness beyond three skin depths.

Frequency Considerations As Bearing Upon Material Selection

The induction heating cooking device with which the vessels of the invention are intended to be used is shown generally schematically in FIG. 1 in which a generally pancake-shaped drive coil 10 underlies a ceramic sheet 12 upon which the flat-bottomed cooking vessel 14 is placed when it is to be used. The currently contemplated cooking device with which the vessels are to be used includes a resonant power oscillator operating in a frequency range of about 20 to 40 kilohertz. At these frequencies the heat is developed mainly from eddy currents as distinguished from hysteresis losses. This ultrasonic frequency range is selected to minimize the generation of undesirable noise. The upper limit is based upon obtaining good utilization of currently available semiconductor devices intended to be employed in the circuitry of the cooking device. It will be appreciated that the principles of the invention are applicable in the design of cooking vessels to be used with cooking devices of other frequency ranges, it being understood that this frequency range is set forth to provide a basis for selection of specific material for exemplary cooking vessels. With this frequency range it is very difficult to satisfactorily heat vessels made from aluminum and copper since their electrial resistivity is very low and reasonable power levels cannot be developed in the materials. In such good conductors, a high current results creating a high reverse field opposing the field induced from the drive coil so that at equilibrium conditions only low power values in the material are available. While a thin foil of such a material would permit higher power levels in the material, they do not provide sufficient mechanical strength for a general purpose vessel.

Other nonmagnetic metals with substantially higher resistivity than aluminum and copper could conceivably be used but their skin depth is substantially higher. For example, a single skin depth for 304 stainless steel would require a thickness of approximately ⅛ of an inch, which would be relatively expensive, heavy and a poor thermal conductor. If a relatively thinner 304 stainless layer were backed with aluminum, there would be sufficient flux penetration beyond the stainless layer and a sufficiently high current flow in the aluminum to significantly reduce the field generated by the drive coil.

Accordingly, with the frequencies of the example, conventional magnetic materials with their relatively high permeability are used so that the magnetic flux from the drive coil can be contained and a reasonably high effective resistance obtained.

The FIG. 2 table sets forth the calculated skin depth at 24 kHz of selected materials, using the approximate permeability and resistivity values set forth in the table. Electrical resistivity changes with temperature of course and the values set forth in the table are those typical at room temperature. With respect to the magnetic permeability values, which depend for a given material upon the magnetizing force, the magnetizing force is assumed to be approximately 100 oersteds and the saturation flux density assumed is approximately 20 kilogauss.

Layer Characteristics and Material

The laminated wall of the vessel 14 illustrated in FIG. 1 is comprised of two basic layers; layer 16 which is closer to the drive coil 10, and layer 18 which is farther from the drive coil 10. The layer 16 confines the magnetic field to prevent substantial penetration of the magnetic field produced by the coil beyond the layer and is accordingly of a magnetic material, preferably with a relatively high electrical resistivity as compared to materials such as aluminum and copper. One currently preferred material for layer 16 is a low carbon steel such as that commonly designated 1010. To insure that the magnetic field does not penetrate substantially beyond layer 16, the layer 16 should have a thickness of at least one skin depth, as calculated with respect to the range of operating frequencies of the cooking device.

One important characteristic of the material of which layer 18 is made is that it have a relatively high thermal conductivity which serves to promote the uniform distribution of heat derived from the other layer or layers of the laminated walls throughout the extent of the layer 18. The currently preferred material of layer 18 is an aluminum base alloy since it is relatively inexpensive and may be easily worked and bonded to other layers. Other materials, having substantially as high a thermal conductivity, such as copper and brasses may also be used.

The vessel 14 is shown in FIG. 1 illustrates the composite layers extending not only throughout the bottom wall of the vessel but also up the side walls. With the pancake-shaped coil 10, whether or not the side walls of the vessel are also laminated is considered unimportant. This would of course be of more importance if the coil were contoured into a shape into which the vessel would nest during heating.

While only two basic layers are shown in the vessel of FIG. 1, additional metal layers are contemplated as being preferred for cost and fabricating reasons. In that connection, reference is made to FIG. 3 which shows the currently preferred structure of the laminated wall for the vessel 14. In this case the layer denoted as 1008 steel is given the same identifying numeral 16 as in FIG. 1 since it performs the same function as the layer 16 of FIG. 1. The layer denoted "aluminum" correspondingly is given the identifying numeral 18. The layer 20, which in use of the vessel is closest to the drive coil is non-magnetic stainless steel, such as 304 as is the layer 22 sandwiched between layers 16 and 18. The preferred characteristics of the additional layer 20 are a low magnetic permeability, a thickness of less than one skin depth within the range of the operating frequencies of the drive coil, and a relatively high electrical resistivity as compared to the electrical resistivity of the layer 16. The purpose of the relatively high electrical resistivity is to enhance the heating effect. This resistivity is preferably not so high, as in the case with porcelains, glasses, and most materials of a nature considered as nonconducting, that no current flow occurs in this additional layer, unless it is decided that the additional heating effect available is to be sacrificed. The relatively low permeability desired is to permit the magnetic flux to mostly pass through and into the layer 16. As currently contemplated, the preferred skin depth would be in the order of about one-twentieth to one-fifth of a skin depth under the operating conditions. Of course, thin outer coatings of porcelain, glass or even copper, for example, can be used for decorative and corrosion resistance.

The layer 22 of 304 stainless steel is included in the currently preferred commercial example for two reasons. First, it has little or no effect on the heating of the utensil since little or no flux penetrates through layer 16. Second, it is easier to bond the aluminum layer 18 to the stainless layer by conventional rolling techniques than it is to bond the aluminum to the carbon steel layer 16. By being relatively thin, heat fow from the steel layer 16 to the aluminum is not appreciably impeded. Finally, a commercially available product of reasonable cost is available in the form of the layers 16, 20 and 22 and which reasonably meets the parameters of our invention. This material is sold under the trademark "TRIPLY" of the Allegheny Ludlum Company. The preferred TRIPLY material, which comes in various thicknesses, is 37 mils in total depth, which includes approximately a 6¼ mil depth of each of the layers 20 and 22, and a 25 mil depth of the layer 16.

In the illustrated laminated wall of FIG. 3 a layer 24 of stainless steel covers the interior face of the cooking vessel for appearance and corrosion resistance. The heat which is laterally conducted by the aluminum layer 18 is conducted through the stainless layer 24 to the material being heated within the vessel. If the cooking vessel is a frying pan, it may be desirable to omit the stainless layer 24, and apply a layer of Teflon to form the interior face of the frying pan.

We claim as our invention:

1. A cooking vessel for use with an induction heating cooking device operating at a frequency between 20 and 40 kilohertz and having a laminated wall adapted to be placed in proximity with the induction coil of said device, said laminated wall including at least three metallic layers comprising:
   one layer of a magnetic material having a thickness of at least one skin depth within the range of operating frequencies of said device when the vessel is in use, to develop the major part of the power in said one layer and to prevent substantial penetration of the magnetic field produced by said coil beyond said layer;
   another layer, farther from said coil than said one layer in use, of relatively high thermal conductivity material, in excess of about 50 BTU/hr/sq. ft/°F./ft., to promote the uniform distribution of heat derived from said one layer throughout said another layer; and
   an additional layer on the face of said one layer opposite said another layer, said additional layer being of a metallic material having relatively low magnetic permeability with the field intensity produced by said coil, a thickness of between one-fifth and one-twentieth of one skin depth within the range of said operating frequencies, and a relatively high electrical resistivity as compared to the electrical resistivity of said one layer.

2. A cooking vessel according to claim 1 wherein: said one layer has a saturation permeability in the range of about 100 to 250.

3. A cooking vessel according to claim 1 wherein: said one layer has a thickness in the range of 2 to 10 of said skin depths.

4. A cooking vessel according to claim 1 wherein: said another layer is an aluminum base alloy.

5. A cooking vessel for use with an induction cooking device operating at a frequency between 20 and 40 kilohertz and having a laminated wall adapted to be placed in proximity with the induction coil of said device, said laminated wall including at least three metallic layers comprising:
   a first layer nearest to said coil of relatively low magnetic permeability and a thickness of between one-fifth and one-twentieth of one skin depth within the range of operating frequencies of the device;
   an intermediate layer of greater thickness than said first layer, said layer being of a magnetic material and having a thickness of at least one skin depth within said range of frequencies to prevent substantial penetration of the magnetic field produced by said coil beyond said intermediate layer; and
   a third layer of high thermal conductivity to promote the uniform distribution of heat derived from said second layer throughout said third layer.

* * * * *